United States Patent
Faita et al.

(10) Patent No.: US 7,670,472 B2
(45) Date of Patent: Mar. 2, 2010

(54) ELECTROLYSIS CELL WITH GAS DIFFUSION ELECTRODE

(75) Inventors: Giuseppe Faita, Novara (IT); Fulvio Federico, Piacenza (IT)

(73) Assignee: Uhdenora Technologies S.R.L., Milan (IT)

( * ) Notice: Subject to any disclaimer, the term of this patent is extended or adjusted under 35 U.S.C. 154(b) by 1097 days.

(21) Appl. No.: 10/494,476

(22) PCT Filed: Nov. 12, 2002

(86) PCT No.: PCT/EP02/12661

§ 371 (c)(1),
(2), (4) Date: Apr. 28, 2004

(87) PCT Pub. No.: WO03/042430

PCT Pub. Date: May 22, 2003

(65) Prior Publication Data

US 2005/0000798 A1 Jan. 6, 2005

(30) Foreign Application Priority Data

Nov. 12, 2001 (IT) .......................... MI2001A2379

(51) Int. Cl.
*C25B 1/30* (2006.01)
*C25B 1/34* (2006.01)
*C25B 1/02* (2006.01)

(52) U.S. Cl. ...................... 205/515; 205/524; 205/554; 205/466; 204/265

(58) Field of Classification Search ................. 205/515, 205/524, 554, 466; 204/265
See application file for complete search history.

(56) References Cited

U.S. PATENT DOCUMENTS

| 5,868,912 | A | * | 2/1999 | Reichert et al. | ............. 204/252 |
| 6,022,634 | A | * | 2/2000 | Ramunni et al. | ............. 429/34 |
| 6,117,286 | A | * | 9/2000 | Shimamune et al. | ........ 204/252 |
| 6,797,136 | B2 | * | 9/2004 | Shimamune | ................ 204/252 |

FOREIGN PATENT DOCUMENTS

WO WO 01/57290 A1 8/2001

* cited by examiner

*Primary Examiner*—Arun S Phasge
(74) *Attorney, Agent, or Firm*—Charles A. Muserlian

(57) ABSTRACT

A membrane electrolysis cell comprising an anodic compartment and a cathodic compartment is described, wherein at least one of the two compartments contains an electrode fed with gas and a porous planar element is interposed between the membrane and the gas-fed electrode. A flow of chemically aggressive electrolyte crosses the porous planar element downwards under the effect of the gravity force. The planar element consists in a plastic element withstanding the aggressive operative conditions: The use of perfluorinated plastics such as ECTFE, PTEFE, FEP, PFA is preferred, even though they are strongly hydrophobic. When the gas-fed electrode is a cathode and the gas contains oxygen, the gas crosses the cathodic compartment upwardly so as to minimize the risk of hydrogen build up. The cell equipped with the oxygen cathode is particularly advantageous for the sodium chloride electrolysis.

27 Claims, 3 Drawing Sheets

ELECTROLYSIS CELL WITH GAS DIFFUSION ELECTRODE

This application is a 371 of PCT/EP02/12261 filed Nov. 12, 2002.

DESCRIPTION OF THE INVENTION

Several industrial processes are carried out in electrochemical cells, such as chlor-alkali electrolysis for the production of gaseous chlorine and caustic soda or potash, water electrolysis primarily for the production of hydrogen, electrolysis of salts to obtain the corresponding acids and bases, e.g. caustic soda and sulphuric acid from sodium sulphate, deposition of metals, among which copper and zinc are the principal. The physiological problem of all these processes is the electric energy consumption which usually constitutes a substantial part of the total production cost. As the electric energy is characterised in all the geographic areas by a cost with a constant increasing tendency, the importance of reducing its consumption in the above indicated electrochemical processes is apparent.

The consumption of energy in an electrochemical process depends primarily from the cell voltage: it is therefore immediately evident the reason of the efforts directed to the improvement of cell design, with the use of more catalytic electrodes and with the decrease of the ohmic drops within the cell structure and in the electrolytes, for instance by decreasing the interelectrodic gap.

In the case of the conventional chlor-alkali process, a solution of sodium chloride, or less frequently potassium chloride, is supplied to a cell containing an anode, whereon gaseous chlorine evolves, while at the cathode, hydrogen is evolved with simultaneous formation of sodium hydroxide (potassium hydroxide in case potassium chloride is fed). In the most advanced type of cell, the caustic soda which is present near the cathode is kept separated from the sodium chloride solution which is fed to the anodic zone by means of a cationic membrane consisting in a perfluorinated polymer containing negatively charged groups, for instance sulphonic and/or carboxylic groups. Such membranes are commercialised by various companies, among whom DuPont/USA, Asahi Glass and Asahi Chemical/Japan. The design of this kind of cell has been studied in depth and it can be affirmed that the technology is nowadays in an optimal state as regards the energy consumption. An example of such kind of design is given in the international patent application WO 98/55670. An analysis of the production cost of chlorine and caustic soda obtained with this advanced cell types indicates however that the impact of the energetic consumption is still relevant. This consideration has generated a series of proposals of further improvement, whose common element is the use of a gas electrode, specifically a cathode fed with oxygen (as such or as enriched air, or simply air deprived of its carbon dioxide content) as a replacement of the hydrogen evolving cathode employed in the previously discussed technology.

A chlor-alkali electrolysis cell comprising a cathode supplied with oxygen-containing gas presents an electric energy consumption which is physiologically much lower than that typical of the conventional technology. The reason for this matter of fact is first of all of thermodynamic nature since the two cells, the conventional one and the one comprising the oxygen cathode, are characterised by different overall reactions:

Conventional cell

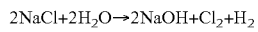

Cell with oxygen cathode

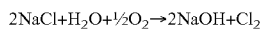

In the practice it is observed that the voltage of a conventional membrane cell supplied with a current density of 4 $kA/m^2$ is about 3 Volts, while that of a cell equipped with membrane and oxygen cathode, working at the same operative conditions, is about 2-2.2 Volts. As it can be seen, an electric energy saving around 30% is achieved (the missed production of hydrogen, which is normally exploited as a fuel, is of a secondary importance). At present, there isn't however any industrial application of electrolysis cells incorporating oxygen cathodes. The reason for this situation lies in the structure of the oxygen cathode and in the requirements imposed to the operative conditions to ensure a good overall efficiency. The oxygen cathode, in brief, is made of a porous support, preferably conductive, whereon a microporous layer formed by an assembly of electrocatalytic particles mechanically stabilised by means of a binder resistant to the operative conditions is applied. The layer may comprise a further film also comprising preferably conductive but non electrocatalytic particles, and a binder. The porous support may consist in a mesh, a variously perforated sheet, a carbon/graphite cloth, carbon/graphite paper or sintered materials. An electrode of such type, with the relevant fabrication procedure, is disclosed in U.S. Pat. No. 4,614,575.

When an electrode as the above mentioned one is employed as oxygen-fed cathode in the chlor-alkali electrolysis, in a parallel position to the cationic membrane, in direct contact or with a moderate gap, indicatively 2-3 mm, the caustic soda produced by the reaction of oxygen on the electrocatalytic particles must be somehow discharged to avoid progressively filling the microporosity of the layer. In fact, should this filling take place, the oxygen could not diffuse anymore through the pores to reach the catalytic particles which act as the reaction sites. The discharge of the caustic soda formed on the cathode electrocatalytic particles may occur essentially in two ways, either towards the membrane, in case the cathode is positioned in parallel to and with a certain gap from the membrane, or towards the oxygen backspace, from the side opposite to the one facing the membrane, in case the cathode is in contact with the membrane itself.

In the former case, a film of liquid is formed, 2-3 mm thick as said, which is normally maintained in circulation upwardly (the cells have vertically disposed electrodes) for extracting the caustic soda produced by the cells, for withdrawing the heat naturally produced by the reaction, and finally for controlling the caustic soda concentration within pre-determined limits, allowing to extend the lifetime of the ion-exchange membrane. This situation establishes a pressure gradient between caustic soda and oxygen at the two sides of the cathode that, as a matter of fact, functions as separating wall. Such gradient can be positive (pressure of the caustic soda higher than the one of oxygen) and it this case it increases from top to bottom under the effect of the hydraulic head. Conversely, the gradient can be negative (pressure of oxygen higher than that of caustic soda) and in this case it decreases from top to bottom, again under the effect of the caustic soda hydraulic head. With the presently available materials and with the known fabrication procedures it is possible to obtain cathodes capable of withstanding pressure differences not greater than about 30 cm (expressed as water column). It follows that for an optimal functioning of the oxygen cathodes, the cells destined to house the same cannot have a height exceeding 30 cm. With greater heights, complete flooding of the cathode occurs with total filling of the porosity by the caustic soda in case of positive differentials, and a heavy loss of oxygen into the caustic soda in case of a negative differential. This fact is seriously negative in the case of electrolysis plants of a certain size, as the total number of cells, each of small dimensions, should be very high with heavy additional costs for the auxiliary equipment (electric connections, ducts, pumps). It must be taken into account that the conventional type industrial cells, that is cells equipped with hydrogen evolving cathodes, have heights usually comprised in the range of 1-1.5 metres. To overcome the above described inconvenience, it has been proposed to utilise a structure whose cathode is spaced apart from the membrane of about 2-3 mm, the global height is again 1-1.5 metres but the cell is subdivided in a number of sub-units, each having a height of about 30 cm. This design entails a remarkable complexity for the connection ducts among the various sub-units, and ultimately an operating complexity and a cost which are not compatible with the industrial applications. A further structure is the one disclosed in U.S. Pat. No. 5,693,202. The design provides that the cell maintain a unitary structure and be equipped with oxygen cathodes partitioned in strips. The oxygen pressure supplied to each strip is automatically regulated taking advantage of the caustic soda hydraulic head through a bubbling system. This kind of cell overcomes the complexity of the above sub-unit partition design, even though it appears intrinsically complicated as concerns the need of ensuring the hydraulic and pneumatic sealing of each strip. Moreover it imposes particular procedures for the shut-downs and start-ups to avoid the loss of pressure compensation in these transitory phases due to lack of oxygen feed. An alternative solution is illustrated in Patent Application EP 0150018 A1, which is however directed to describe a cell, possibly having an interposed diaphragm or ion-exchange membrane between anodes and cathodes, and with a falling film of liquid wetting the electrodes, whereon gas evolving reactions take place. Thus Patent Application EP 0150018 A1 is not really directed to solve the previously indicated problems, but rather those associated with the release of the produced gas bubbles from the reaction liquid in which they are formed, as in fact it is clearly stated in the initial part of the text. The difficulties associated with the release of the gas bubbles from liquids give rise essentially represented by the anodic and cathodic pressure variations, vibrations, harmful for the ion-exchange membranes, partial blocking of the electrodes under the action of the adhering bubbles and finally increased ohmic drop, as the electrolyte electric conductivity is evidently decreased by the presence of gas. It is therefore clear that, for Patent Application EP 0150018 A1, the fact that the electrodes are completely covered by a film of liquid, even of variable thickness, is not a problem of primary relevance as the process under consideration is the formation of gas bubbles and the release thereof from the liquid phase and not the diffusion of the gas and its consumption upon the electrode surface (a typical problem, as previously seen, of oxygen-fed cathodes). A further proposal is disclosed in Patent Applications EP 1033419 A1 and WO 01/57290 wherein a cell suitable for membrane chlor-alkali electrolysis equipped with an oxygen cathode at fixed gap from the membrane is described. The caustic soda is fed in the upper part of the cell and flows downwards in the gap delimited by membrane and cathode. The caustic soda flow-rate is in this case very high and in order to limit the same to a level of practical interest a porous layer is introduced between membrane and cathode. The oxygen is also fed with some excess in the upper part of the cell and is discharged from the lower part together with the caustic soda. This device allows to dynamically cancel the caustic soda hydraulic head, so that the pressure differential between caustic soda and oxygen can be maintained at very low and constant levels, achieving ideal operating conditions for the oxygen cathode. According to EP 1033419 A1 the porous layer is characterised by hydrophilicity: in practice, plastic materials are therefore excluded, particularly as regards the perfluorinated plastic materials which on one hand are very well resistant in the reaction environment made aggressive by the presence of peroxide traces, but on the other hand are highly hydrophobic. Therefore, only the metals or oxides thereof, typically hydrophilic, can be employed to produce the porous layers of the invention. Nevertheless such materials, in contact with concentrated hot caustic soda, are characterised by a certain release of metal ions which are in time absorbed by the ion-exchange membranes with consequent lessening of performances, in particular in terms of cell voltage and faradaic efficiency. The sole metal truly immune from these inconveniences is silver, whose surface results protected in the operating conditions by an impervious and very scarcely soluble oxide: it is clear however that the extensive use of silver in the construction of electrolysis cells entails costs which are hardly sustainable from industrial applications.

In the latter case, that of operation with the oxygen cathode in direct contact with the membrane, disclosed for instance in U.S. Pat. No. 6,117,286, the only possibility for caustic soda discharge is toward the gap occupied by the oxygen, on the side of the cathode opposed to the one facing the membrane. In this case a series of problems arises, as listed below:

The caustic soda that is forced to flow across the cathode tends to fill the porosity, hampering the oxygen diffusion. To avoid this inconvenience it has been proposed to subdivide the cathodes into strips and to interpose between membrane and cathode strips a porous element, also hydrophilic as in the above cited Patent Application EP 1033419 A1, along which part of the formed caustic soda can be released.

The caustic soda released on the oxygen side has a distinctive tendency to wet the cathode back-wall forming a continuous film again hampering the oxygen diffusion. To prevent this harmful effect, it is necessary that the cathode back-wall be strongly hydrophobic, which can diminish the surface electric conductivity with consequent complications for the electric contact needed to supply the electric current.

The concentration of the product caustic soda is necessarily that generated by the reaction and no control under pre-determined limits is possible, as it happens instead in the former case of oxygen cathode wherein a forced circulation exists. The product caustic soda concentration value is around 37-45% depending on the amount of water transported across the membrane, an amount depending on the type of membrane and on the operative conditions of current density, temperature and concentration of alkali chloride solution.

The ion-exchange membranes available on the market are irreversibly deteriorated when they come in contact even for relatively short times with caustic soda of concentration higher than 35%. It has therefore been suggested to operate the cell with oxygen cathode in direct contact with the membrane with diluted solutions of alkali chloride, as it is known that the amount of transported water increases as the alkali chloride concentration decreases. Nevertheless the flexibility of operation allowed by this factor is limited, as too low concentrations of alkali chloride worsen the membrane efficiency, increase the rate of oxygen in the chlorine and can lessen the operating life of the anodes. For this reason it has been proposed, as an additional measure, to saturate the oxygen with water vapour at temperatures close to the operating temperature of the cell; the water vapour diffusion across the pores of the cathode permits further lowering the caustic soda concentration towards the values acceptable for the membrane. This action, however, is only partially effective since part of the water vapour is absorbed by the caustic soda released from the back surface of the cathode.

The object of the present invention is to provide a structure of electrolysis cell equipped with gas diffusion electrode free of the drawbacks of the existing technology. In consideration of the industrial relevance of the chlor-alkali electrolysis, reference will be made herebelow to a cell suited for this use, making clear that the invention may be advantageously applied to other electrochemical processes, such as the electrolysis of alkali sulphates (feeding the anodic compartment with a sulphate containing solution, and the relative gas diffusion anode with hydrogen), the production of hydrogen peroxide (feeding the cathodic compartment with an alkaline solution, and the relative gas diffusion cathode with oxygen), the production of electric energy with alkaline fuel cells (feeding the alkaline electrolyte in the two compartments, both provided with gas diffusion electrodes, supplied with hydrogen and oxygen).

The cell structure of the invention comprises an oxygen cathode pressed against the ion-exchange membrane, a porous planar element interposed between the cathode and the membrane and crossed by a downward flow of caustic soda as known in the art, with the characterising difference that the constitutive material of the porous planar element is selected from the group of the hydrocarbon plastic materials such as polyethylene, in particular high density polyethylene, and preferably from the group of perfluorinated plastic materials (such as ethylene-chlorotrifluoroethylene ECTFE, polytetrafluoroethylene PTFE, tetrafluoroethylene-hexafluoropropylene FEP, perfluoroalcoxy polymers PFA), having high mechanical resistance also at high temperature and substantial chemical inertia towards hot concentrated caustic soda also in the presence of peroxide traces and thus not capable of producing harmful contamination of the membranes. All of these materials are highly hydrophobic and thus their use is in strong contrast to what proposed by the prior art technique, according to which hydrophilicity is an essential feature.

According to a preferred embodiment, a further characteristic of the present invention is given by the oxygen-containing gas feed in the lower part of the cell: in this way, the ascending gas flow effectively displaces the hydrogen formed in small amounts as a side product of the oxygen consuming reaction, avoiding dangerous build ups in stagnant zones. Hydrogen appears when the electrolysis cell is operated at high current density, as more as longer is the cathode operating life as a consequence of the natural and inevitable decay in the catalyst activity.

The way of obtaining such results of great industrial relevance will be made clear in the following detailed description of the invention making reference to the attached figures.

Figure 1:
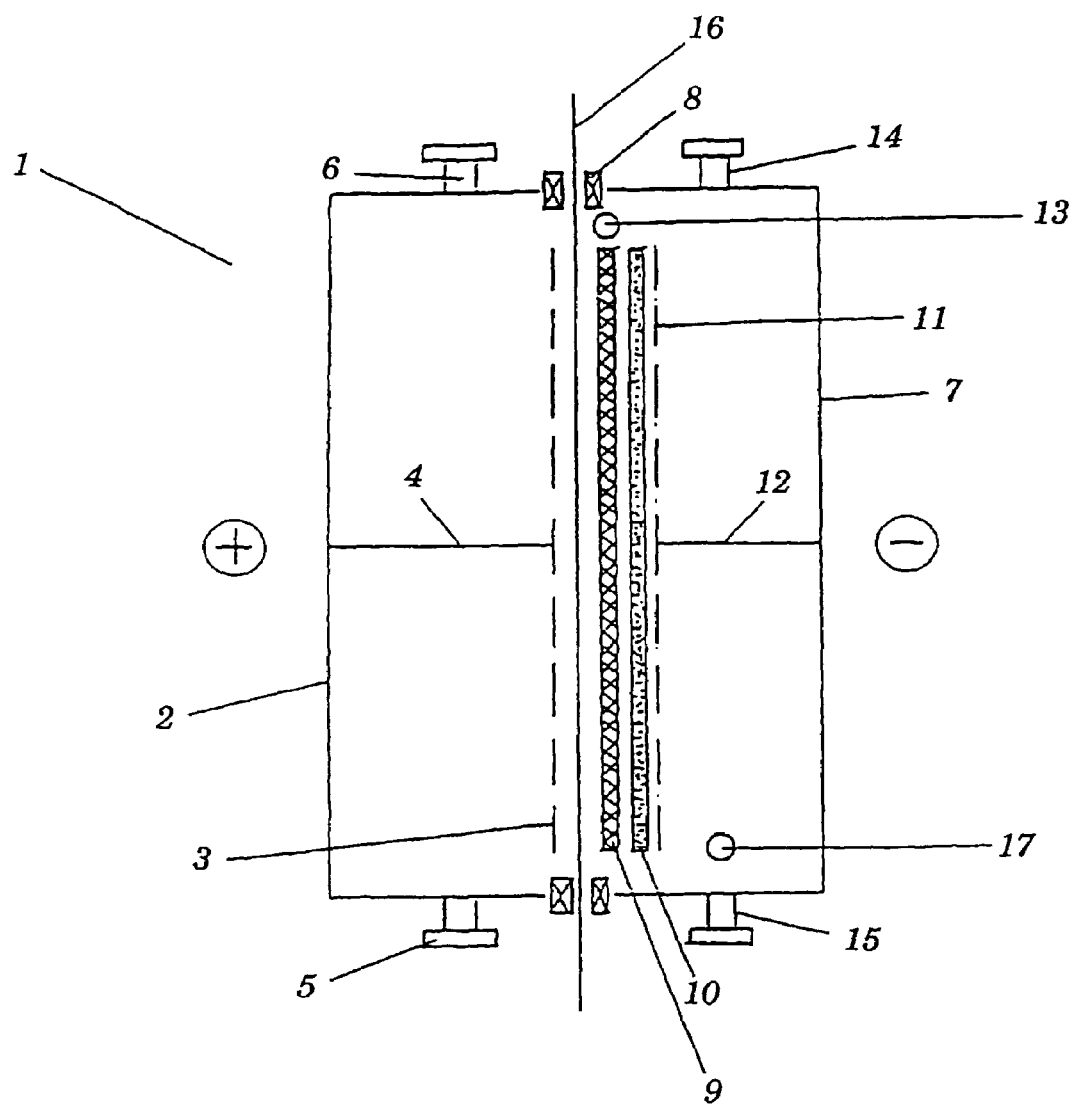
FIG. 1 is a side view of the cell of the invention.

It is known to the experts in the art that the industrial electrolysers and the fuel cells are preferably made of a multiplicity of elementary cells in hydraulic and electrical connection, pressed one against the other to form a modular arrangement; such electrical connection may be of monopolar or bipolar type. Also the cell of the invention is therefore suitable to constitute one of the repeating element of a modular electrolyser or fuel cell. Making reference to FIG. 1, the cell of the invention 1 is formed by two shells, anodic 2 and cathodic 7, which in the case of a chlor-alkali electrolyser are preferably constructed with titanium and nickel, respectively. The two shells are mutually fastened with tie-rods or jacks not represented in the figure, or with any other system of the prior art, and enclose the cationic membrane 16 which acts as the separator of the two compartments, anodic and cathodic.

The cationic membrane employed in the chlor-alkali, and specifically sodium chlorine electrolysis, consists in a perfluorinated polymer on whose backbone sulphonic groups (side facing the anode 3) and carboxylic groups (side facing the cathode 10) are inserted. Membranes of this kind, characterised by low internal ohmic resistance and capable of operating at high current densities, typically 3-5 kA/m$^2$, are provided by the companies DuPont/USA, Asahi Glass and Asahi Chemical/Japan respectively under the trade names Nafion®, Flemion® and Aciplek®. The peripheral sealing, necessary to avoid chlorine, oxygen, sodium chloride solution and caustic soda to be released to the external environment, is ensured by the perimetral gaskets 8. The anodic shell 2 contains the anode 3, consisting in a titanium sheet with openings, e.g. expanded or perforated sheet, provided with an electrocatalytic layer for the evolution of chlorine from chloride, based on platinum group metals or mixed oxides thereof and containing also oxides of valve metals, in particular titanium. The anode 3 is secured to the shell 2 by means of supports 4 that also allow to transmit the electric current from the wall of the shell itself to the anode. The cathodic current distributor 11, consisting in a metallic foil with openings, e.g. a metallic mesh, an expanded or perforated sheet, preferably made of silver or as an alternative of nickel, stainless steels or nickel alloys, silver coated for an optimal electric contact, is secured to the cathodic shell 7 through the supports 12, that allow an easy current transmission between the shell itself and the surface of the distributor. The current distributor preferably consists in a first conductive foil, of higher thickness, provided with openings, to which a second thin conductive foil with openings of smaller dimensions is overlaid, wherein said second foil is in contact with the oxygen diffusion cathode. Between the distributor 11 and the membrane 16, the oxygen-fed cathode 10 and the hydrophobic planar element 9 of the invention are inserted, respectively on the current distributor side and on the membrane side. The oxygen cathode consists in a porous conductive support whereto electrocatalytic particles stabilised by a suitable binder are applied as known in the art. The catalysts of the electrocatalytic particles are the platinum group metals, and principally platinum, their oxides, sulphides and more generally their chalcogenides, pyrochlores (particularly ruthenium pyrochlores), silver and gold. An interesting analysis of the scientific knowledge on this topic is reported in the book Electrochemical Hydrogen Technologies, edited by H. Wendt, Elsevier, 1990, Cap. 3 "Electrocatalysis of the Cathodic Oxygen Reduction", K. Wiesener, D. Ohms. These catalysts can be used as bulk powders, optionally in admixture, to which graphite powders are optionally added with the double purpose of increasing the transversal electric conductivity within the layer and decreasing the amount of employed catalyst, so that an optimal compromise is achieved between performances and cost. This latter objective can be also accomplished by resorting to catalysts supported on a conductive material free of catalytic activity, e.g. carbons optionally graphitised in part, like those commercialised by Cabot Corp. under the trademark Vulcan XC-72 or Shawinigan Acetylene Black (hereafter SAB) well known to the specialists of the field.

Cathodes suited to function with oxygen and incorporating the above indicated materials are disclosed, with the relevant fabrication methods, in the patent literature, e.g. in U.S. Pat. Nos. 4,614,575, and 5,584,976.

A correct choice of the kind of hydrophobic planar element (void volume percentage, average pore diameter size, thickness) and of the caustic soda flow-rate permits to achieve the following results known in the art, namely: equalisation of the pressure of the caustic soda flowing downwardly inside the planar element by gravity force, with substantial reduction of the positive or negative pressure differential existing between caustic soda and oxygen (that makes the oxygen cathode structure scarcely critical), and control of the concentration of caustic soda in contact with the membrane within the optimal range 30-35% that allows better performances and longer membrane lifetime, thanks to the heat withdrawal capability of the caustic soda flow.

The shape of the planar element can be much varied. As a non limiting example, foams, preferably with open cells, mattresses consisting in entangled coils of wire, planar meshes formed by layers of crossed and overlaid wires, planar meshes of woven wires, meshes of wires profiled so as to create surfaces with protruding regions and recessed regions can be mentioned. The planar element can be made of just one of these components or also of an assembly of overlapped components.

The compression necessary to guarantee an intimate contact between membrane-planar element-oxygen cathode-current distributor can be mechanically ensured if the supports 12 of the current distributor are provided with elasticity and undergo a deflection when the shells 2,7 with the various constitutive elements are tightened. Alternatively the necessary elasticity may be achieved also when the supports 12 are rigid, if a component provided with elasticity, such as a conductive mattress made of coils or undulated layers, is added to the planar element-oxygen diffusion cathode-current distributor assembly. The necessary compression can be finally obtained maintaining the pressure inside the anodic shell 2 higher than that inside the cathodic shell 7. This higher pressure pushes the membrane against the hydrophobic planar element-oxygen cathode-current distributor assembly, whose supports 12 are in this case rigid, determining an effective contact across the whole extension of the various interfaces. During operation, the positive and negative poles of the current generator are connected respectively to the anodic shell 2 and to the cathodic shell 7, the fresh sodium chloride solution is fed to the nozzle 5, the depleted sodium chloride solution and the product chlorine are extracted from the nozzle 6, the fresh caustic soda solution is injected through the distributor 13, e.g. a perforated tube, and crosses longitudinally the planar element 9 downwards, and the obtained caustic soda solution, consisting in a mixture formed by the injected caustic soda and the caustic soda produced at the cathode 10, under the effect of the oxygen reaction, is discharged from the nozzle 15.

The invention provides, as a first innovative feature, that the porous planar element inserted between membrane and oxygen cathode be made of highly inert plastic materials, preferably of the perfluorinated type and thus distinguished by high hydrophobicity, and in a preferred embodiment, as a second innovative feature, that the oxygen (or oxygen-containing gas) flow upwardly, as it is fed with a 10-20% excess with respect to the amount required by the total current supplied to the cathode, to the lower nozzle 17 (or to the same nozzle 15 used for discharging the product caustic soda if suitably dimensioned) while the excess is discharged from the upper nozzle 14.

The materials taken into consideration in the prior art for the production of the planar elements are of the hydrophilic type: this feature was probably introduced since the wettability by the caustic soda is deemed necessary to prevent oxygen bubbles generated by leakage through the cathode porosity from adhering in a permanent way to the inner surface of the planar element. It is apparent that in this circumstance the electric current flow, hindered by the gaseous phase, would concentrate in the liquid-occupied areas with consequent increase in the cell voltage. Hydrophilicity limits the choice of materials which may be utilised for the construction of the planar element essentially to metals and metal oxides, since the plastic materials are, in general, typically hydrophobic. For instance, assuming a surface tension of 80 dyne/cm for the caustic soda solution, the detected contact angle is respectively 130° for PTFE, 120° for paraffin and 105° for polyethylene. It is known conversely that the hydrophilic materials are characterised by contact angles lower than 90°: the metallic surfaces are considered, in general, completely wettable and in fact they present contact angles with caustic soda close to 0°. If from a theoretical standpoint the complete wettability effectively provides a good warrant of having a planar element completely occupied by the liquid, it is also true that the metals or metal oxides to which assignment must be made in order to achieve such wettability, are generally not stable enough in the presence of hot caustic soda containing peroxide traces. By insufficient stability here it is not meant that the planar element is structurally destroyed in relatively short operating times, but rather that a release of metal ions sufficient, albeit slow, to contaminate the membrane polymer with consequent decay of performances in unacceptable times from a practical standpoint, would take place. The only metal that seems to be free of this effect is silver whose protective oxide, sufficiently impervious and insoluble, lowers the release of metal ions to values not capable of damaging the membranes. It is apparent however that the construction of the planar element with silver entails production costs unsustainable for a wide industrial production. Also the use of other metals, such as stainless steel or nickel, coated with a silver layer, does not represent a solution: in fact, since the planar element is in direct contact with the membrane, the ion release must be maintained at extremely low levels which may be guaranteed only by layers of high thickness obtainable with expensive procedures. The criticality of the planar element is in fact clearly superior to that of the current distributors (11 in FIG. 1) which, being substantially spaced from the membrane surface, may be made of a metal coated with a thin and rather cheap silver layer: the inevitable porosity of the layer allows a certain release of ions from the base metal, which is anyway tolerable considering the position of the current distributor with respect to the membrane. As a conclusion, the prior art teaching, with its recommendation of utilising hydrophilic materials for the production of planar elements, makes particularly surprising the present invention according to which much satisfying results are obtained employing plastic materials for the planar element, and particularly perfluorinated plastic materials characterised as seen above by high contact angles and thus highly hydrophobic. These plastic materials can be used as such or also as a non porous coating, for instance 0.2-0.3 mm thick, applied to metallic planar elements produced with carbon steel, stainless steel, nickel alloys. With the hydrophobicity characterising the above indicated materials the oxygen bubble trapping within the planar element structure should be physiologic, and the voltages of the cells equipped with the planar elements of the invention should thereby result clearly higher than those typical of equivalent cells realised according to the disclosure of EP 1033419 A1, that is with planar elements with hydrophilic characteristics. Without wishing to limit the present invention in any way, it is possible that the expected negative effect due to the entrapped bubbles does not arise as a consequence of the presence of the cathode in a position immediately adjacent to the planar element: the cathode is in fact an electrode designed to absorb oxygen and, thanks to this function, is capable of consuming the oxygen bubbles possibly present in the planar element, if not completely, certainly in a substantial fashion. Therefore, if this theoretical hypothesis corresponds in effect to the reality, it can be understood how the oxygen cathode-hydrophobic planar element combination according to the invention may be employed with results at least as satisfying as those obtainable with the oxygen cathode-hydrophilic planar element coupling disclosed in the prior art. This conclusion is adequately supported by the experimentation described in Example 1, wherein it is also demonstrated that the operating stability of the cells realised in accordance with the invention is exceptionally high. This result of great industrial relevance most likely derives from the chemical inertia of the perfluorinated materials employed as a preferred solution for the fabrication of the planar element. The chemical inertia prevents the release of substances capable of polluting the membranes also after prolonged operating times. The experimentation described in the same Example 1 also demonstrates that cells constructed, according to the prior art teachings, with hydrophilic planar elements made of metals, are affected by a slow increase in time of the cell voltages, a problem which is not solved upon applying a silver layer, even of consistent thickness, to the base metal: only when the planar element is made of pure silver the stability of the cell voltage results comparable to the one of the cells of the present invention. As a further advantage, perfluorinated plastics are distinguished by good mechanical characteristics also in the temperature range 80-90° C. typical, as known, of the chlor-alkali electrolysis. Consequently the planar element keeps its shape unaltered, and in particular as concerns both the void to occupied volume ratio and the porosity, without being squeezed by the elastic supports or the pressure differential employed to keep in intimate contact the membrane-planar element-oxygen cathode-current distributor assembly as previously illustrated.

The invention provides, in a particularly preferred embodiment, that the oxygen (or oxygen-containing gas) be fed in the lower part of the cell crossing the gap located in the rear part of the oxygen cathode upwardly. This type of flow assumes a fundamental importance for the safety of operation of the cell. To understand this point, which is of fundamental importance for whatever industrial application, it is convenient to remind that the chlor-alkali electrolysis is characterised by two distinct cell voltage values depending whether the operation is in the conventional way with the hydrogen evolving cathode, or with the oxygen cathode: in the former case the cell voltage is comprised between about 2.5 Volts (low current densities) and typically 3-3.3 Volts (current density around 3-5 kA/m$^2$), while in the latter case the cell voltage ranges between about 1.6 and 2.2-2.6 Volts, with a substantial saving in the consumed energy as initially discussed. The functioning at 2.2-2.6 Volts occurs when the cell is operated at the highest current densities (as required in the industrial applications to minimise the capital investment) and in particular after a certain number of hours in operation when the activity of the catalyst incorporated in the oxygen cathode has undergone an inevitable, physiological decay. As indicated a little above, cell voltage values equal to or higher than 2.5 Volts permit also hydrogen evolution, particularly in the areas wherein, for constructive (e.g. reduced porosity) or operation related reasons (e.g. complete localised flooding) oxygen diffusion is hampered. In these situations, therefore, hydrogen evolution and oxygen consumption occur simultaneously and hydrogen is inevitably mixed with the oxygen that flows along the rear part of the cathode with formation of potentially explosive mixtures. To prevent these hazards, the hydrogen percentage in oxygen must be monitored by using suitable sensors placed on the discharge of exhausted oxygen (or oxygen-containing gas). As it has been found in the experimentation at the basis of the present invention (see Example 2), with the oxygen fed in the upper part of the cell this kind of measurement is totally unreliable since the hydrogen contents measured by the sensors are strongly variable in time, unrelated to the effective production of hydrogen which is a function of the operating conditions, particularly cell voltage and current density. This unreliability is not an intrinsic feature of sensors but is rather inherent to the mechanisms of hydrogen build up in the gap reserved to the flow of oxygen, which has a vertical development of 1-1.5 m. In fact, when oxygen is supplied in the upper part of the cells, a process of hydrogen layering takes place due to the lower density of this gas with respect to that of oxygen: simplifying, it can be said that a countercurrent flow is established between the oxygen moving downwards from the top to the bottom of the cell and the hydrogen which has a natural tendendy to ascend to the top. This situation leads easily, particularly in the areas of low circulation, to the formation of pockets rich in hydrogen, and therefore dangerous, which render the operation completely unreliable. The periodic release of these pockets produces the oscillations of hydrogen percentage in the discharged oxygen as measured by the sensors.

Figure 2:
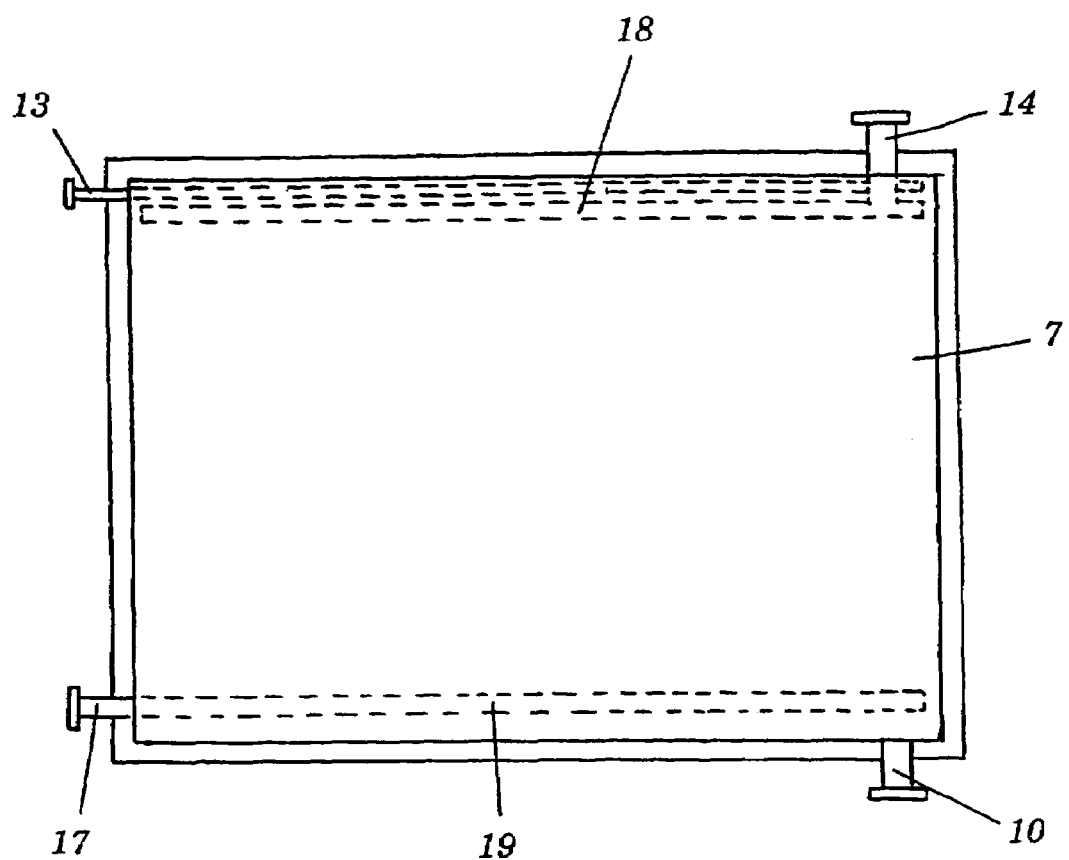
FIG. 2 is a front view of the cell of the invention according to a preferred embodiment.
Figure 3:
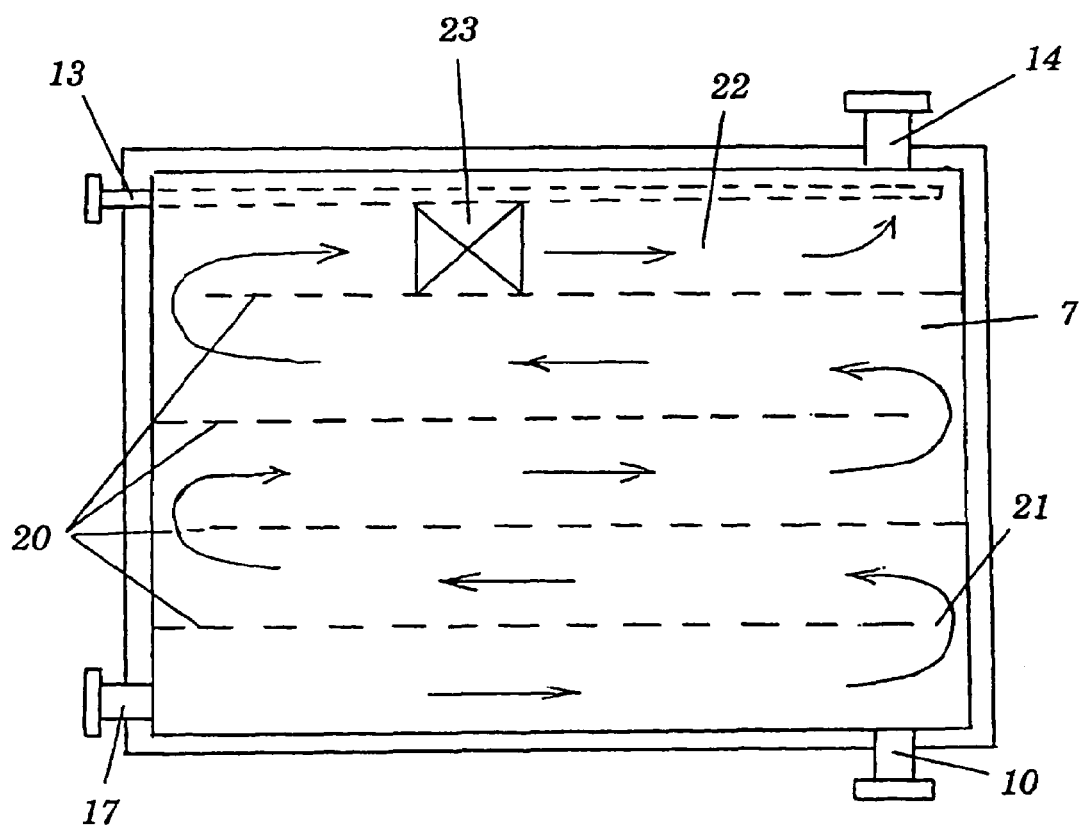
FIG. 3 is a front view of the cell of the invention according to another preferred embodiment.

Conversely, if hydrogen is supplied to the lower part of the cell, his upward flow results concurrent with the direction of hydrogen diffusion, which is naturally ascending as said above. As a matter of fact, an oxygen-driven drag is induced on the hydrogen, which is very effective in preventing the formation of pockets with high hydrogen content. This working hypothesis is in fact confirmed by the data provided by the sensors, whose oscillations result extremely limited (see Example 2). It is evident, as a conclusion, that the oxygen feed in the lower part of a cell equipped with a depolarised cathode substantially increases the operation reliability and it's not a mere variation of the prior art technique, which invariably proposes feeding from the top. The efficiency of feeding form the bottom can be further increased by adopting inlet distributors and outlet manifolds for the oxygen, e.g. consisting in a perforated tube of the same length of the cell and placed in the lower and upper part thereof. This type of design is shown in FIG. 2 wherein a front view of the cell of FIG. 1 is sketched. The outlet 14 of the oxygen (supplied in excess in the lower part of the cell) is connected to the internal manifold 18, and the inlet of the same 17 to the distributor 19, both consisting in perforated tubes, in which the holes are preferably localised along the lower generatrix to allow an easy discharge of possible condensed phases. A further improvement of the second feature of the invention consists in the introduction of suitable baffles directed to impart a zigzag motion with high linear velocity to the oxygen flow, favouring the homogeneous mixing with hydrogen. This device is shown in FIG. 3 wherein the baffles, shaped as horizontal strips, are identified with 20. The direction of the gas flow is indicated by the arrows. The strips 20 are provided with some holes, not shown in the figure, to facilitate the discharge of condenses separated on the surfaces thereof. The overall section of the holes is at least one order of magnitude inferior to the flow section 21 existing between the terminal part of each strip and the periphery of the cell.

Finally, in the oxygen flow section, and preferably in sections 22 of the embodiment of FIG. 3, porous masses 23 can be advantageously inserted, consisting in highly porous material, characterised by low resistance to the gas flow and provided on its surface with a catalyst film capable of promoting the hydrogen-oxygen recombination, such as for example a modest amount of platinum group metal, like platinum itself and palladium. With this last embodiment not only the object of a high gas mixing is achieved, but also the percentage of free hydrogen is concurrently reduced. It is thus possible to operate the cells equipped with oxygen cathode in full safety conditions also when the quantities of generated hydrogen are relevant and capable of forming unstable mixtures even in case of optimal mixing obtained according to the provisions of the present invention.

The present invention has been described referring to the chlor-alkali electrolysis with oxygen cathode, as this is the application of greater industrial relevance. As initially said, the present invention results useful also for other processes, such as for instance the electrolysis of alkaline sulphates, in which a hydrogen consuming anode is used instead of the conventional oxygen evolving anode, as disclosed in U.S. Pat. No. 4,561,945. In this case the planar element with all the previously seen characteristics is interposed between membrane and hydrogen consuming anode and is crossed by a percolating solution of sulphuric acid optionally containing an alkaline sulphate. Moreover, hydrogen is supplied to the lower part of the cell to prevent the local enrichment in oxygen, an anode by-product in the stagnating zones, in a totally similar fashion as discussed for the chlor-alkali electrolysis.

A further application may be that of the alkaline fuel cells.

EXAMPLE 1

The data of this Example have been obtained in the laboratory making use of some cells constructed according to the sketch of FIG. 1. In particular, each cell had a height of 100 cm and width of 10 cm, with the two shells, anodic 2 and cathodic 7 respectively made of titanium and nickel. Furthermore the anode 3, sustained on rigid supports 4, consisted of a 1 mm thick titanium flattened expanded mesh with rhomboidal openings (diagonals=4 mm×8 mm) provided with an electrocatalytic film for chlorine evolution comprising titanium, iridium and ruthenium oxides. The current distributor 11 was made of two portions, both comprising a 1 mm thick nickel expanded mesh with rhomboidal openings (diagonals=4 mm×8 mm), secured on flexible supports 12, welded to a second 0.5 mm thick expanded nickel mesh with small rhomboidal openings (diagonals=2×4 mm), galvanically coated with 10 micrometres of silver to guarantee a suitable multiplicity of contact points with low electric resistance with the oxygen cathode. The oxygen cathode comprised an 80 mesh silver wire net (0.2 mm diameter) with a layer of catalyst particles suitable for oxygen reduction applied on a face thereof (20% silver on Vulcan XC-72 carbon, for a total 20 grams/m$^2$ of silver) mixed with tetrafluoroethylene particles 1:1 by weight, and a second layer of SAB carbon particles mixed with tetrafluoroethylene particles 1:1 by weight on the other face thereof, all sintered at 330° C. with a final thickness of 0.5 mm.

The planar elements were made of meshes formed by 1 mm diameter wire, overlapped and welded to form rhomboidal openings (diagonals=5×10 mm) characterized by continuous channels on both faces, having a total thickness of about 2 mm, respectively produced with polytetrafluoroethylene, high density polyethylene and polypropylene, according to the invention, and as a comparison with nickel coated with 10 microns of silver and pure silver according to the prior art.

When the two shells, anodic 2 and cathodic 7, were tightened with suitable tie-rods, the cathodic current distributor 11 exerted a pressure of about 300 grams/cm$^2$ on the anode-membrane (Nafion N2010WX type)—planar element-oxygen cathode assembly, pushed by the flexible supports 12.

The anodic compartment of the cell was flown by an about 20% sodium chloride solution, while a solution of 32% caustic soda percolated along the planar element with a time constant flow-rate of about 25 litres/hour. Finally, the cell was supplied with pure oxygen in the upper part with a 10% excess with respect to the requirement of the reaction. The residual oxygen was discharged from the lower part of the cell through an appropriate nozzle (17 in FIG. 1). At a temperature of 85° C. and with the current regulated at 400 Amps (4000 A/m$^2$) the cell voltage detected after a two day settling period resulted to be 2.30 Volts, practically independent from the planar element type. However, after 42 days of operation, while the voltage of the cells equipped with the planar element made of polytetrafluoroethylene, high density polyethylene, polypropylene and pure silver resulted unvaried, that of the cell comprising the silver coated nickel net showed an increasing tendency of the order of 30-40 millivolts per day. At 2.5 Volts, the operation was discontinued and the cell was inspected finding that the membrane presented a brown colouring. A subsequent analysis showed that the membrane contained a substantial amount of nickel. After about 50 days of operation, a rapid increase was detected in the voltage of the cells containing the polypropylene planar elements, accompanied by a sharp reduction of the percolating caustic soda flow-rate. During the inspection carried out after shutdown and opening of the cells, a sensible squeezing of the planar element was detected, attributable to the extensive cracking of the polypropylene planar element, probably caused by the attack of peroxide traces on the tertiary carbon atoms of the polymer chain. The deterioration produced a substantial reduction of the available section for the percolation of the caustic soda.

An inspection conducted at the seventy-second day of operation on the cell equipped with the high density polyethylene planar element has shown a partial squeezing with still no effect on the flow-rate of the percolating caustic soda.

The operation of the cells equipped with planar elements of polytetrafluoroethylene and silver went on until reaching 224 days with an overall voltage increase of 20-30 millivolt and without appreciable variations in the flow-rate of caustic soda percolation. At a visual inspection, the various parts did not shown anything abnormal. The membrane, of colourless appearance, resulted to contain, at a subsequent analysis, small quantities of calcium and magnesium proceeding from the sodium chloride solution and only negligible traces of nickel.

EXAMPLE 2

The tests of the present Example were carried out using the cell of the Example 1 equipped with the planar element made of polytetrafluoroethylene according to the present invention, with the sole exception of the content of silver used as the electrocatalyst, which was limited to 10 grams/m$^2$. The purpose was reproducing, since the beginning of the operation, the conditions of scarce activity arising in time as a consequence of the unavoidable catalyst poisoning due to impurities contained in the circulating caustic soda and/or catalyst alterations caused by shutdowns and subsequent start-ups (dissolving/re-depositing phenomena that change the catalyst particle size).

Operating in the conditions indicated in Example 1 and particularly with current densities of 4000 Amps/m$^2$ a stable voltage of 2.6 Volts was detected. In this situation, an analysis of hydrogen contained in the discharged oxygen in the two cases of oxygen fed from the lower section of the cell, according to the present invention, and from the upper section, as described in the prior art, was carried out.

In the former case a volume concentration of 470 parts per million (ppm), reasonably stable in time (maximum fluctuations of about 50 ppm) was detected, while in the latter case rather modest concentrations, e.g. of the order of about 50 ppm, alternated with peaks of 4000-5000 ppm. Such a behaviour can be likely explained assuming that hydrogen is produced mainly in areas of limited extension characterised by a difficult oxygen diffusion, and that the descending flow of oxygen opposes to the natural tendency of hydrogen to diffuse towards the upper part of the cell. This situation may lead to the formation of hydrogen rich pockets, potentially very hazardous for the safety of operation. The possibility of a local hydrogen enrichment is certainly removed operating in accordance with the present invention with an ascending flow of oxygen, substantially concurrent with the natural direction of the hydrogen diffusion.

The invention claimed is:

1. Electrolysis cell for an electrochemical process comprising an anodic compartment comprising an anode and a cathodic compartment containing a cathode separated by an ion-exchange membrane, at least one of the compartments containing an assembly consisting of a current distributor connected to the wall of the relative compartment by means of supports, a gas diffusion electrode in contact with the surface of the current distributor, means for feeding said gas-diffusion electrode with gas located in the lower part of the cell, means for discharging the exhausted gas from the gas-diffusion electrode located in the upper part of the cell, and a planar porous element made of a hydrophobic plastic material selected from the group of high density polyethylene and fluorinated plastics inserted between said membrane and said gas-diffusion electrode and adapted to be fed with at least one liquid reactant percolating in its interior.

2. The cell of claim 1 wherein the said plastic material has hydrophobic behavior towards said percolating reactant, with a mutual contact angle not less than 90°.

3. The cell of claim 2 wherein the said fluorinated plastics are selected from the group consisting of polytetrafluoroethylene, ECTFE, PFA and FEP.

4. The cell of claim 1 wherein said plastic material is a coating applied to a metallic material.

5. The cell of claim 1 wherein the porous planar element comprises at least one component selected from the group consisting of foams, planar meshes consisting of crossing and overlapping of wires, planar meshes of interwoven wires, meshes with controlled profile, mattresses of wire coils, expanded meshes and sintered layers.

6. The cell of claim 1 wherein the current distributor comprises a first conductive foil provided with openings overlaid to a second conductive foil provided with openings of smaller dimensions than those of said first foil, and said second foil is in contact with said gas diffusion electrode.

7. The cell of claim 6 wherein said first conductive foil is rigid.

8. The cell of claim 6 wherein said first foil and second foil are selected from the group consisting of expanded meshes, meshes of wires and perforated sheets.

9. The cell of claim 1 wherein the current distributor supports are elastic and said current distributor exerts a compression of the gas diffusion electrode and of the porous planar element against the ion-exchange membrane.

10. The cell of claim 9 wherein the said elastic supports comprise a conductive mattress made of coils or undulated sheets.

11. The cell of claim 1 wherein the current distributor is divided into at least two parts.

12. The cell of claim 1 wherein only one of the anodic and cathodic compartments comprises the assembly made of current distributor, gas diffusion electrode and porous planar element, the current distributor supports are rigid, the internal pressure of said compartment comprising the assembly made of current distributor, gas diffusion electrode and porous planar element is lower than the pressure of the other compartment and the membrane compresses said assembly.

13. The cell of claim 1 wherein said gas fed to the lower part is forced to a zigzag motion by baffles.

14. The cell of claim 13 wherein catalytic porous masses are inserted in the flow section of said gas.

15. An electrolyzer consisting in a modular arrangement of elementary cells, wherein at least one of the cells is a cell of claim 1.

16. The electrolyzer of claim 15 wherein the elementary cells are in monopolar electrical connection.

17. The electrolyzer of claim 15 wherein the elementary cells are in bipolar electrical connection.

18. In an electrochemical process comprising the electrolysis of alkali metal halides in a cell, the improvement comprises using a cell of claim 1.

19. The process of claim 18 wherein the cathodic compartment comprises an oxygen-fed gas diffusion cathode and a porous planar element fed with an alkali metal hydroxide solution percolating in its interior.

20. The process of claim 19 wherein said oxygen is fed at the bottom and discharged from the top.

21. In an electrochemical process comprising the production of hydrogen peroxide in a cell, the improvement comprising using a cell of claim 1.

22. The process of claim 21 wherein the cathodic compartment of said cell comprises an oxygen-fed gas diffusion cathode and a porous planar element fed with an alkali metal hydroxide solution percolating in its interior.

23. The process of claim 22 wherein said oxygen is fed at the bottom and discharged from the top.

24. In an electrochemical process comprising the electrolysis of alkali metal sulfates in a cell, the improvement comprising using a cell of claim 1.

25. The process of claim 24 wherein the anodic compartment comprises a hydrogen-fed gas diffusion anode and a porous planar element fed with a sulfuric acid solution percolating in its interior, said solution optionally comprising an alkali metal sulfate.

26. In an electrochemical process comprising the generation of electric current in an electrochemical cell, the improvement comprising using a cell of claim 1.

27. The process of claim 26 wherein said cell is an alkaline fuel cell, and both compartments, anodic and cathodic, contain the assembly made of a current distributor, a gas diffusion electrode and a porous planar element.

* * * * *